United States Patent
DeJong et al.

(10) Patent No.: US 8,434,847 B2
(45) Date of Patent: May 7, 2013

(54) SYSTEM AND METHOD FOR DYNAMIC STRETCH REFLEX PRINTING

(75) Inventors: Joannes N M. DeJong, Hopewell Junction, NY (US); Lloyd A. Williams, Mahopac, NY (US); Ruddy Castillo, Briarwood, NY (US); Matthew Dondiego, West Milford, NJ (US)

(73) Assignee: Xerox Corporation, Norwalk, CT (US)

( * ) Notice: Subject to any disclaimer, the term of this patent is extended or adjusted under 35 U.S.C. 154(b) by 22 days.

(21) Appl. No.: 13/196,269

(22) Filed: Aug. 2, 2011

(65) Prior Publication Data

US 2013/0033535 A1 Feb. 7, 2013

(51) Int. Cl.
*B41J 29/38* (2006.01)

(52) U.S. Cl.
USPC .......................................................... 347/14

(58) Field of Classification Search .................... 347/14, 347/8, 35; 399/396; 400/624
See application file for complete search history.

(56) References Cited

U.S. PATENT DOCUMENTS

| | | | |
|---|---|---|---|
| 6,739,688 B2 | 5/2004 | Kniazzeh et al. | |
| 7,467,838 B2 | 12/2008 | Folkins et al. | |
| 7,510,256 B2 | 3/2009 | Guarino et al. | |
| 7,559,549 B2 | 7/2009 | Clark et al. | |
| 7,665,817 B2 | 2/2010 | Folkins | |
| 7,678,229 B2 | 3/2010 | Wilke, II | |
| 2003/0007023 A1* | 1/2003 | Barclay et al. | 347/8 |
| 2004/0114951 A1 | 6/2004 | Kawagoe | |
| 2006/0024104 A1 | 2/2006 | Castelli et al. | |
| 2006/0233569 A1 | 10/2006 | Furst et al. | |
| 2008/0124158 A1* | 5/2008 | Folkins | 399/396 |
| 2009/0122106 A1* | 5/2009 | Ray | 347/35 |
| 2009/0265950 A1 | 10/2009 | Mizes et al. | |
| 2010/0123752 A1 | 5/2010 | Eun et al. | |
| 2011/0280645 A1* | 11/2011 | Lindsay et al. | 400/624 |

* cited by examiner

*Primary Examiner* — Stephen Meier
*Assistant Examiner* — Carlos A Martinez
(74) *Attorney, Agent, or Firm* — Maginot, Moore & Beck, LLP

(57) ABSTRACT

A method of adjusting the operation of printheads in a printing system with a moving sheet carrying device has been developed. The method includes identifying a first amount of sheet carrying device displacement and second amount of sheet carrying device displacement as the sheet carrying device carries a media sheet past first and second printheads, respectively, for imaging of a predetermined location of the media sheet. A time for operating the second printhead is adjusted based on a difference between the first sheet carrying device offset and the second sheet carrying device offset to provide color registration between ink drops of the first printhead and second printhead on the media sheet.

23 Claims, 6 Drawing Sheets

SYSTEM AND METHOD FOR DYNAMIC STRETCH REFLEX PRINTING

TECHNICAL FIELD

This application relates generally to printing devices that form images on one or more sheets of print media carried on a moving member, and, more particularly, to inkjet printing devices having belts that carry one or more sheets of a print medium past a plurality of printheads that eject inks having multiple colors.

BACKGROUND

Various printing systems include a moving belt that carries one or more sheets of print media through a predetermined path while images are formed on the media sheets. An example of such a device is an inkjet printer that includes a moving belt. The moving belt carries one or more media sheets past two or more marking stations that eject ink drops onto the media sheets. The marking stations are located at different positions along the path of the belt. In some embodiments, each marking station is configured to eject ink having a single color. Each marking station forms a portion of a color image using one ink color on each media sheet, and the juxtaposition of the different colored inks from the marking stations forms a full-color image on the media sheets. One common example of such a printing system forms images using a combination of inks having cyan, magenta, yellow, and black (CMYK) colors. In one such system, each marking station includes one or more printheads that are configured to eject ink drops onto the media sheets at predetermined locations to form ink images on the media sheets.

One aspect of printing systems that carry print media on a moving belt is the stability of each media sheet as the media sheet passes each printhead for the ejection of ink onto the media sheet. Different printer embodiments incorporate various components that generate a force to hold each media sheet flat against the moving belt. Some printers incorporate a vacuum source that is coupled to vacuum platen. The vacuum platen includes a plurality of passageways or ports to enable air to be drawn through the platen towards the vacuum source. The vacuum platen is positioned and oriented so it is adjacent the back side of the belt as the belt carries the print media by the marking stations. The belt may include a plurality of holes to enable the vacuum source to exert pressure on the media sheets through the belt. Thus, the air being pulled through the platen urges the media against the belt to help stabilize the media while it is being printed. Other embodiments may include an electrostatic member positioned adjacent to the back side of the belt that generates an electrical charge opposite an electrical charge on the media sheets, attracting the media sheets and the moving belt to the electrostatic member. Still other embodiments may include mechanical members, such as gripper bars or hold-down rolls that push the media sheets against the front-side of the moving belt, and consequently push the moving belt against a support member, such as a backer roll, positioned on the back side of the moving belt.

As the belt travels through the print zone, friction between the belt and other structural members of the printer in the print zone generates drag on the belt. The drag causes the belt to stretch as the belt moves through the print zone. In addition to the friction between the belt and structures in the print zone, the additional force applied to each media sheet to hold the media sheet against the belt in the print zone produces friction and drag between the moving belt and the structural members in the print zone. The total drag force exerted on the belt changes as each sheet enters the print zone, passes through the print zone, and exits the print zone. Since one or more media sheets may pass through the print zone at different times, the total frictional force and drag on the belt may vary, with the force increasing when more media sheets are in the print zone and decreasing when fewer media sheets are in the print zone.

The changes in frictional forces also change the total drag and stretch of the belt as the belt passes the marking stations. The changes in the stretch of the belt, in turn, result in changes to the relative position of the media sheets and the marking stations as the media sheets pass the marking stations. The changes in relative position may cause errors in the formation of images on each media sheet, referred to as registration errors. Thus, improvements that reduce or eliminate registration errors in printing systems that carry one or more media sheets on a belt are beneficial.

SUMMARY

In one embodiment, a method for operating a printer that includes a moving sheet carrying device has been developed. The method includes operating an actuator to move a sheet carrying device in a process direction through a print zone at a predetermined speed, moving a first media sheet on the sheet carrying device past a first end of the print zone and through the print zone in the process direction, identifying a first sheet carrying device displacement with reference to a drag force exerted on the sheet carrying device when a predetermined location of the first media sheet is at a first location in the print zone that corresponds to a first printhead, operating the first printhead to eject ink onto the first media sheet at the predetermined location, identifying a second sheet carrying device displacement with reference to a second drag force exerted on the sheet carrying device when the predetermined location of the first media sheet is at a second location in the print zone that corresponds to a second printhead, adjusting a time to operate the second printhead with reference to the predetermined speed of the sheet carrying device and a difference between the first sheet carrying device displacement and the second sheet carrying device displacement, and operating the second printhead with reference to the adjusted time to eject ink onto the predetermined location of the first media sheet. The second printhead is located from the first printhead in the print zone in the process direction.

In another embodiment, a method for operating a printer has been developed. The method includes operating an actuator to move a sheet carrying device in a process direction through a print zone at a predetermined speed, identifying a first drag force exerted on the sheet carrying device in the print zone, moving a first media sheet through the print zone on the sheet carrying device in the process direction, identifying a second drag force exerted on the sheet carrying device in the print zone in response to the first media sheet being entirely within the print zone, storing a value corresponding to the first drag force in a memory, and storing a value corresponding to the second drag force in the memory.

In another embodiment, a printing system that is configured to print on media sheets on a sheet carrying device has been developed. The printing system includes a first printhead and a second printhead arranged in a process direction in a print zone, a sheet carrying device configured to carry at least one media sheet in the process direction past the first printhead and the second printhead, an actuator operatively connected to the sheet carrying device and configured to move the sheet carrying device through the print zone at a predetermined speed, a media sensor configured to generate a signal in response to the at least one media sheet on the sheet carrying device moving past the media sensor in the process direction, a member positioned to engage the sheet carrying device in the print zone and configured to apply a force to the at least one media sheet to urge the media sheet against the sheet carrying device and the sheet carrying device against the member, the sheet carrying device being configured to carry the at least one media sheet past a first end of the member and through the print zone, and a controller operatively connected to the plurality of printheads, the actuator, and the media sensor. The second printhead is located from the first printhead in the process direction in the print zone. The controller is configured to operate the actuator to move the sheet carrying device in the process direction through the print zone at the predetermined speed, identify a location of a first media sheet on the sheet carrying device in the print zone as the first media sheet moves through the print zone in the process direction with reference to the signal from the media sensor and the predetermined speed of the sheet carrying device, identify a first sheet carrying device displacement with reference to a drag force exerted on the sheet carrying device by the member when a predetermined location of the first media sheet is at a first location in the print zone that corresponds to the first printhead, operate the first printhead to eject ink onto the first media sheet at the predetermined location, identify a second sheet carrying device displacement with reference to another drag force exerted on the sheet carrying device by the member when the predetermined location of the first media sheet is at a second location in the print zone that corresponds to the second printhead, adjust a time to operate the second printhead with reference to the predetermined speed of the sheet carrying device and a difference between the first sheet carrying device displacement and the second sheet carrying device displacement; and operate the second printhead with reference to the adjusted time to eject ink onto the predetermined location of the first media sheet.

DETAILED DESCRIPTION

Figure 1:
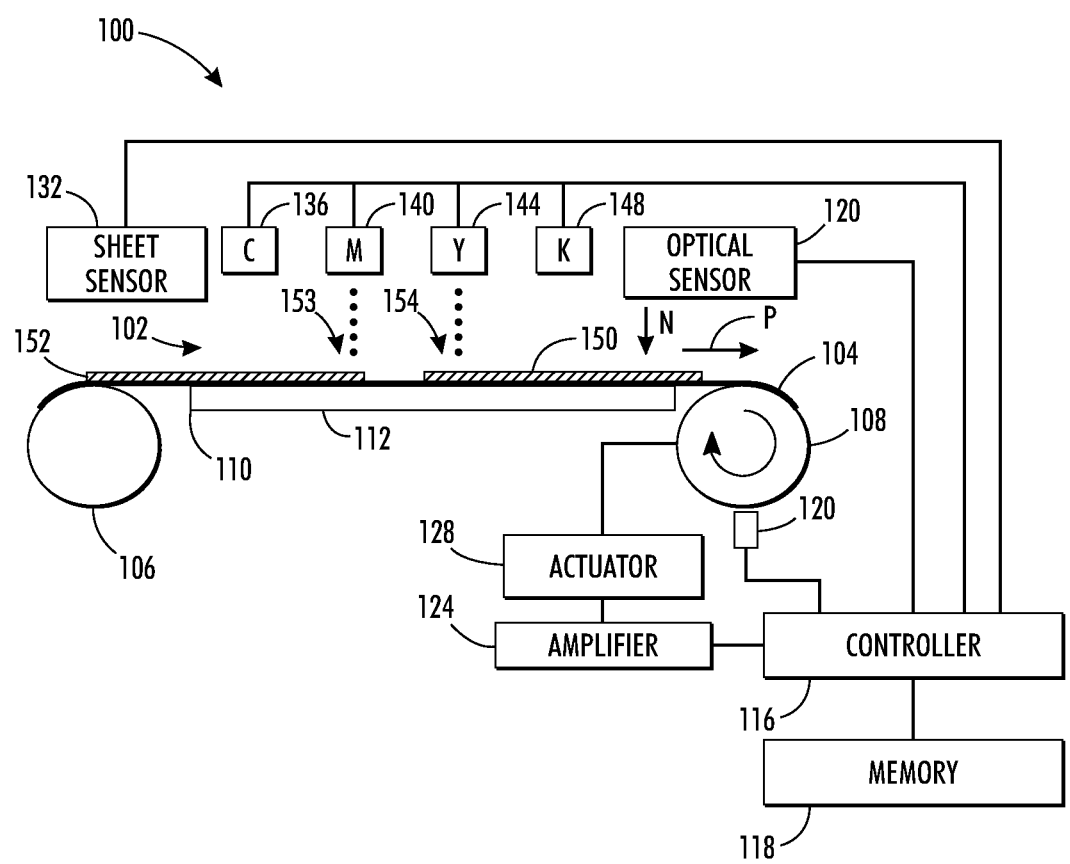
FIG. 1 is a schematic diagram of a marking unit including a moving belt configured to carry one or more media sheets past printheads in a print zone in the marking unit.

For a general understanding of the environment for the system and method disclosed herein as well as the details for the system and method, the drawings are referenced throughout this document. In the drawings, like reference numerals designate like elements. As used herein, the word "printer" encompasses any apparatus that performs a print outputting function for any purpose, such as a digital copier, bookmaking machine, facsimile machine, a multi-function machine, or the like. As used herein, the term media sheet refers to a piece of recordable print media that may receive images in a printer such as an inkjet printer. As used herein, the term "print zone" refers to a section of a printing device where media sheets move past one or more printheads. The printheads eject ink onto the media sheets to form images, and may form color images using inks having various different colors. The print zone also includes a member that holds media sheets flat to enable uniform printing. As used herein, the terms belt, conveyor belt, and sheet carrying device all refer to a movable member that is configured to carry one or more media sheets past printheads arranged in a print zone. The belt is formed from a material having a predetermined modulus of elasticity and the belt stretches under application of a drag or tension force to the belt. The terms "displacement" and "stretch" are used interchangeably to refer to changes in the dimension of a belt due to drag forces or other tension forces applied to the belt. The belt moves through the print zone in a direction referred to as a process direction. The belt enters the print zone from an "upstream" position and moves "downstream" in the process direction through the print zone.

FIG. 1 depicts a schematic view of a multi-color marking unit 100 including a moving belt 104 that is configured to carry media sheets past printheads 136-148 for imaging operations. The marking unit 100 includes belt 104, a guide roll 106, a drive roll 108, vacuum platen 112, controller 116, velocity sensor 120, amplifier 124, actuator 128, sheet sensor 132, and printheads 136, 140, 144, and 148. A print zone 102 in the marking unit 100 includes the portion of the marking unit 100 containing the printheads 136-148, the vacuum platen 112, and the portion of the belt 104 that moves over the vacuum platen 112. FIG. 1 shows a portion of belt 104 that extends between a guide roll 106 and drive roll 108 over vacuum platen 112. In the embodiment of FIG. 1, belt 104 is an endless belt that moves from the drive roll 108 through a belt tensioning assembly (omitted for clarity) and returns to the guide roll 106. Drive roll 108 is operatively connected to the actuator 128 that rotates the drive roll 108. Actuator 128 may be a direct current (DC) or alternating current (AC) electric motor, stepper motor, hydrostatic drive, or any other suitable actuator. The actuator may be directly coupled to the drive roll 108, or, in some embodiments, the actuator is operatively connected to the drive roll 108 using one or more gears, belts, or other transmission systems. The drive roll 108 pulls the belt 104 in the process direction P as the drive roll 108 rotates. A rotational velocity sensor 120 generates an electrical signal corresponding to the rotational velocity of the drive roll 108. Common embodiments of the rotational velocity sensor 120 include mechanical encoders, optical wheel encoders, and Hall effect sensors. Sheet sensor 132 is positioned at a first end 110 of the vacuum platen 112 at the upstream end of the print zone 102 to identify the position of media sheets as the media sheets enter the print zone 102. In some embodiments, sheet sensor 132 is an optical detector that generates a signal in response to detection of a leading edge of the media sheet as the media sheet begins to move into the print zone 102, and a trailing edge of the media sheet when the entire media sheet has entered the print zone 102.

The vacuum platen 112 is operatively connected to a negative pressure source (not shown) that applies negative pressure to the surface of the belt 104 as the belt 104 moves over the vacuum platen 112. The belt 104 includes openings that enable the negative pressure applied through the vacuum platen 112 to engage one or more media sheets, such as media sheets 150 and 152, which are carried on the media belt 104. The negative pressure holds the media sheets 150 and 152 in place against the belt 104 to prevent the sheets from curling and to maintain a uniform distance between each sheet and printheads 136-148. The negative pressure applied to the media sheets 150 and 152 increases the normal force N between the belt 104 and the vacuum platen 112 in regions of the belt 104 that carry the media sheets when compared to regions of the belt 104 that are empty. In FIG. 1, media sheet 152 is partially over the vacuum platen 112 with a portion of the media sheet 152 being positioned beyond a first end 110 of the vacuum platen 112 and within the print zone 102. The first end 110 of the vacuum platen 112 also forms a first end of the print zone 102, with the belt 104 carrying media sheets past the first end 110 into the print zone 102 in the process direction P. A corresponding increase in the dynamic frictional forces, or drag forces, between the belt 104 and the vacuum platen 112 applied to the belt 104 also occur when one or more media sheets are over the vacuum platen 112. As described in more detail below, belt 104 stretches when a drag force is applied to the belt 104, and the magnitude of stretch changes as the level of drag applied to the belt changes. While marking unit 100 includes a vacuum platen 112 configured to hold media sheets 150 and 152 in place, alternative configurations may include an electrostatic member, gripper bars, or other structures that hold the media sheets against the belt 104 and increase the drag on the belt 104.

Printheads 136, 140, 144, and 148 in print zone 102 are configured to eject drops of ink having cyan, magenta, yellow, and black colors, respectively, onto media sheets, such as media sheets 150 and 152, as the media sheets pass each printhead. The printheads eject ink drops of various types of ink including, but not limited to, solvent based, UV-curable, aqueous, gel, and phase-change inks. While the print zone 102 depicts four printheads configured to eject inks having four different colors, alternative printhead configurations include different arrangements and numbers of printheads that eject inks having different colors than those described herein.

The controller 116 may be implemented with general or specialized programmable processors that execute programmed instructions. The instructions and data required to perform the programmed functions may be stored in memory associated with the processors or controllers. The processors, their memories, and interface circuitry configure the controllers to perform the processes, described more fully below, that enable the controller to better control inkjet firing for improved image registration. These components may be provided on a printed circuit card or provided as a circuit in an application specific integrated circuit (ASIC). Each of the circuits may be implemented with a separate processor or multiple circuits may be implemented on the same processor. Alternatively, the circuits may be implemented with discrete components or circuits provided in VLSI circuits. Also, the circuits described herein may be implemented with a combination of processors, ASICs, discrete components, or VLSI circuits. Multiple controllers configured to communicate with a main controller 116 may also be used.

Controller 116 is operatively connected to the velocity sensor 120, amplifier 124, sheet sensor 132, and printheads 136-148. During an imaging operation, the controller 116 operates the actuator 128 to pull one or more media sheets through the print zone 102, and the controller 116 operates the printheads 136-148 to eject ink drops onto the media sheets to form images. The controller 116 operates the actuator 128 by sending electrical control signals to the amplifier 124. The amplifier 124 receives the electrical control signals and generates a corresponding electric drive current that operates the actuator 128 and drive roll 108. In one embodiment, the controller 116 generates a voltage signal as the control signal and amplifier 124 generates a drive current that is proportional to a voltage level of the signal. During imaging operations, the drive roll 108 rotates at a substantially constant angular velocity to pull the belt 104 and media sheets through the print zone at a substantially constant velocity in the process direction P. The controller identifies the rotational speed of the drive roll 108 from the electrical signals generated by the velocity sensor 120.

Figure 5:
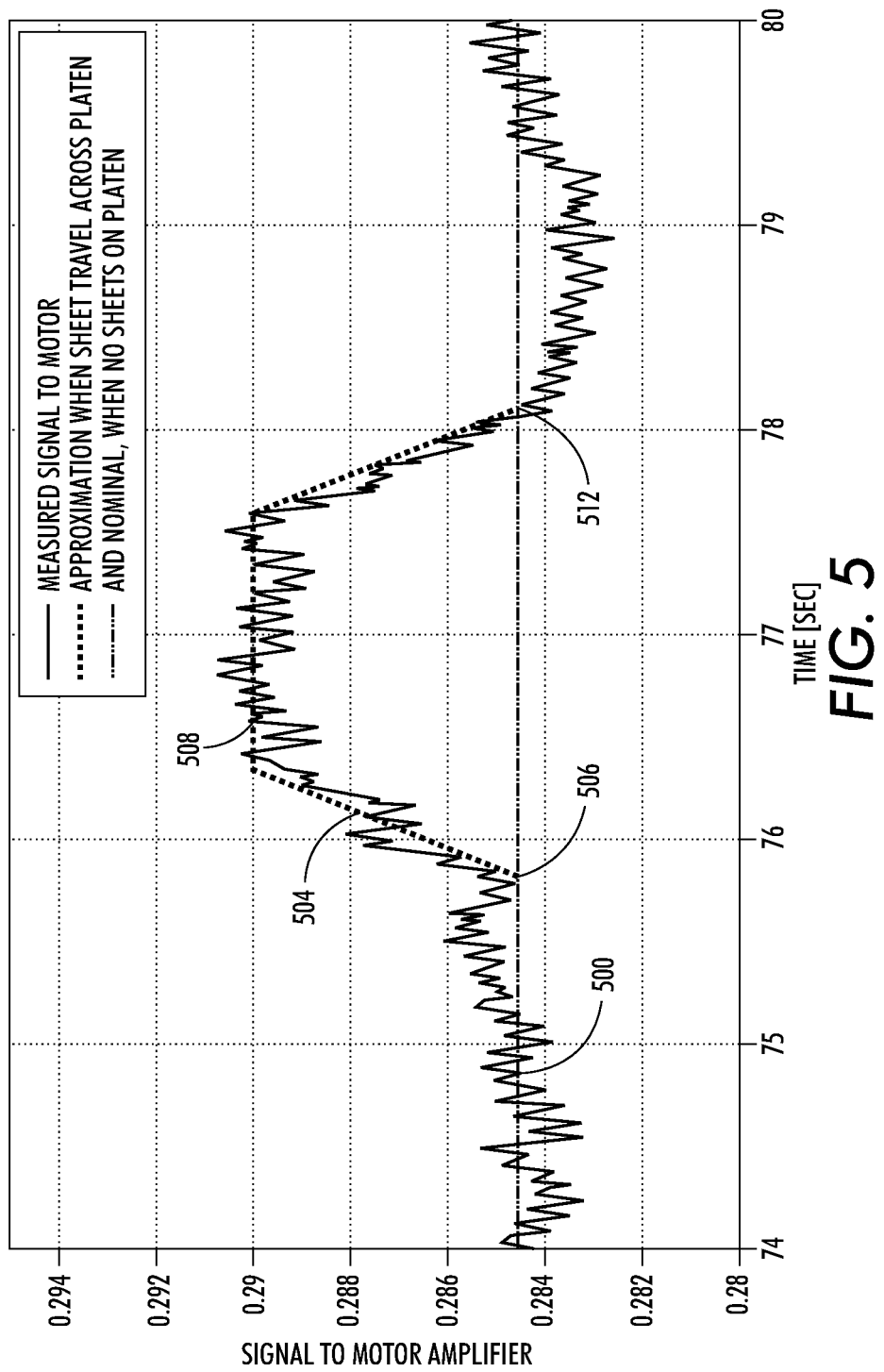
FIG. 5 is a voltage diagram depicting changes in a control voltage applied to an actuator as a media sheet moves through the print zone.

As one or more media sheets move through the print zone 102 over the vacuum platen 112, the force of friction or drag exerted on belt 104 changes. The corresponding voltage level of the drive signal generated by the controller 116 also changes to operate the drive roll 108 at the predetermined angular velocity. As seen in FIG. 5, line 500 depicts a nominal control signal voltage applied to the amplifier to pull the belt 104 at the predetermined speed when the belt carries no media sheets in the print zone 102. Line 504 depicts an increase in the control voltage signal to maintain the velocity of the drive roll 108 as a single media sheet begins to move over the vacuum platen at reference 506, is fully over the vacuum platen at reference 508, and exits the vacuum platen at reference 512. When the sheet is fully over the vacuum platen 508, the maximum drag force for a single media sheet is applied to the belt and the corresponding control signal is also at a maximum value. The increased control voltage and corresponding drive voltage supplied to the actuator 128 while one or more media sheets move over the vacuum platen 112 results in a corresponding increase in torque that the actuator 128 generates to rotate the drive roll 108. Thus, the increase voltage level of the control signal is a function of the increase in drag force exerted on the belt 104. As seen in FIG. 6, the relationship between the voltage of the control signal and the drag force may be characterized using a linear function, although other embodiments use various other functions, including splines to characterize the relationship.

Figure 6A:
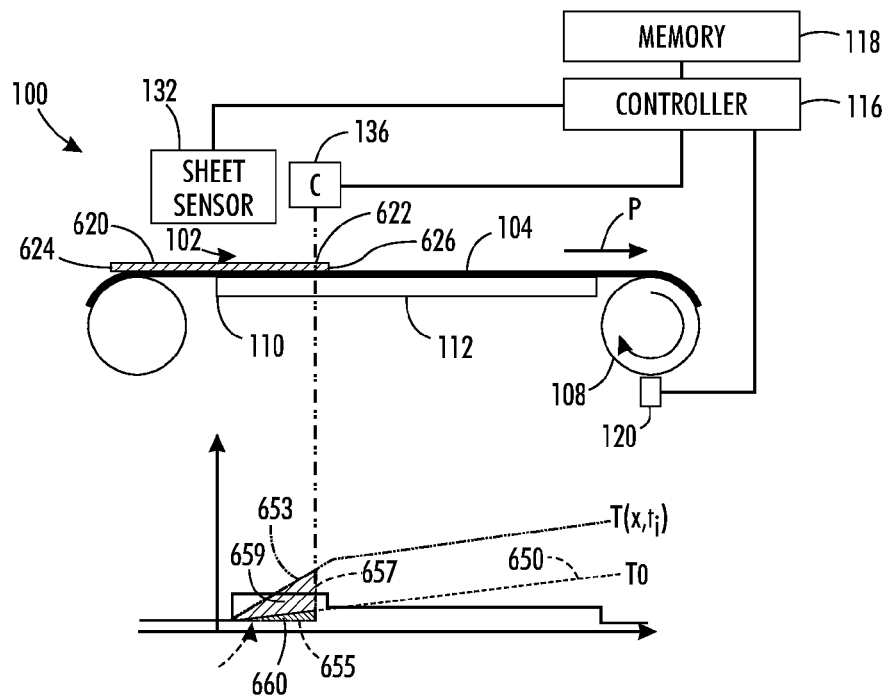
FIG. 6A depicts the marking unit of FIG. 1 with a media sheet in a first position in the print zone.
Figure 6B:
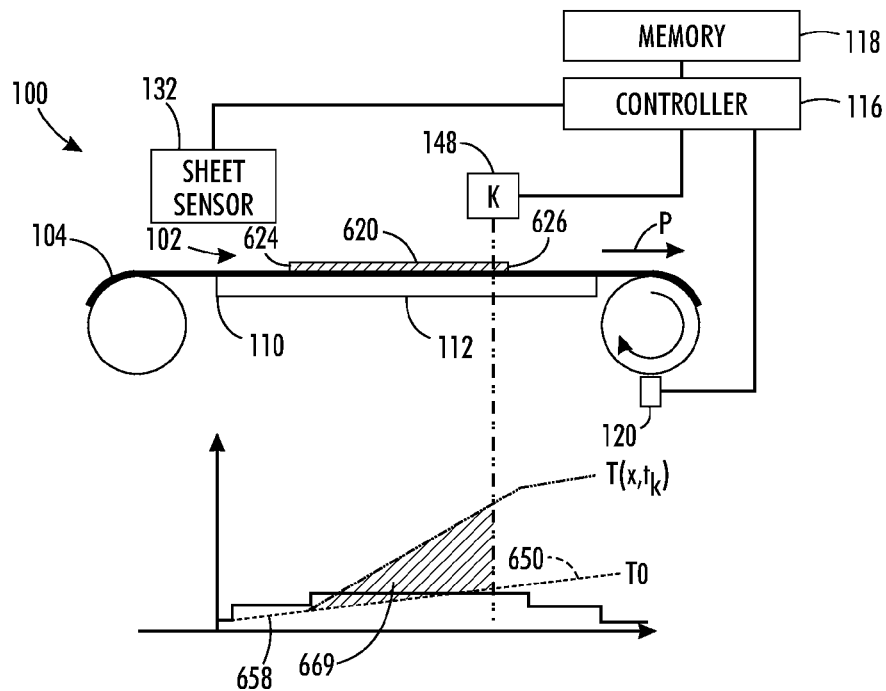
FIG. 6B depicts the marking unit of FIG. 1 and FIG. 6A with the media sheet in a second position in the print zone.

FIG. 6A and FIG. 6B depict simplified views of the marking unit 100 of FIG. 1 including graphical representations of drag forces applied to the belt 104 as a media sheet 620 moves over the vacuum platen 112. Mathematically, the cumulative drag force profile T(x,t) applied to the belt 104 at a given time t as the belt 104 moves through the print zone 102 is characterized by the following equation:

$$T(x, t) = \int_{x=0}^{x} g(x, t) * u(x, t) dx$$

Where x represents a position taken along the length of the print zone 102, g(x,t) is a function describing the normal force exerted on the drive belt 104, and u(x,t) is the coefficient of dynamic friction between the belt 104 and various structures in the print zone including the vacuum platen 112. In many embodiments, u(x,t) is a constant or other function that may be determined empirically from the materials and configuration of the print zone 102 when moving the belt 104 at a predetermined velocity. The normal force function g(x,t) characterizes the normal force between the belt 104 and various structures in the print zone 102, including the vacuum platen 112, at each location x for a given time t. When the belt 104 moves through the print zone 102 without carrying media sheets, the normal force at each location on the belt x over the vacuum platen 112 is uniform across the belt 104. Thus, a baseline drag force profile referred to as T0 that characterizes the drag forces applied to the belt 104 may be characterized with a straight line, seen as line 650 in FIGS. 6A and 6B. The slope of the line 650 is determined by the constant normal force and dynamic coefficient of friction on the belt 104.

The relative displacement of the belt P(x,t) at a position x and time t is the integral of the difference between the belt displacement as one or more media sheets are carried on the belt through the print zone and the belt displacement when there are no media sheets on the belt T0, as characterized in the following equation:

$$P(x,t) = k\int (T(x,t) - T0) dx$$

Here, k is a proportionality constant that relates the drag force placed on the belt 104 to the displacement, or stretch, placed on the belt. In the print zone 102, k is characterized as $$k = \frac{1}{EA}$$

where E is the modulus of elasticity of the material forming the belt 104, and A is the surface area of the belt 104 that contacts the vacuum platen 112.

Using the equation for P(x,t) enables identification of the displacement of the belt 104 at a given position and time in the print zone 102. During imaging operations, two or more printheads may eject drops of ink having various colors onto a single location on the media sheet. The ink drops are positioned proximate to one another to form multi-color images. As the media sheet 620 moves through the print zone 102, the displacement of the belt 104 changes. As seen in FIG. 6A, a cyan printhead 136 ejects ink onto a predetermined location 622 of the media sheet 620 at a first time $t_i$ and at a first position in the print zone $x_i$. In the example of FIG. 6A, a portion of the media sheet 620 is over the vacuum plenum 112 as the printhead 136 prints to location 622. A proportion of the length of the media sheet 620 between the first end 110 of the vacuum platen 112 and the predetermined location 622 is urged against the belt 104 and results in an additional drag force exerted on the belt 104 by the vacuum platen 112. A first amount of displacement on the belt $P(x_i, t_i)$ is proportionally related to the area 659 between the baseline drag force exerted on the belt T0 and the cumulative drag force $T(x_i, t_i)$ at the location on the media sheet 620 where the cyan printhead 136 ejects ink drops. The media sheet 620 moves downstream in the process direction through the print zone 102 for imaging by other printheads including the black printhead 148. The black printhead 148 is positioned downstream of the cyan printhead in the print zone 102. As the media sheet moves past the black printhead 148, a different amount of belt displacement $P(x_k, t_k)$, proportional to area 669 shown in FIG. 6B, occurs when location 622 moves past the black printhead 148. The difference in the displacement of the belt 104 between the cyan printhead 136 and the black printhead 148 for the given location 622 on the sheet 620 may be expressed as: $\Delta P = P(x_k, t_k) - P(x_i, t_i)$. The difference in belt displacement $\Delta P$ is equivalent to a magnitude and direction of color registration error between printheads 136 and 148 when ejecting ink drops onto location 622 on the media sheet 620. In the configuration shown in FIG. 6A and FIG. 6B, a negative value of $\Delta P$ indicates that the direction of the registration error is in the same direction as the process direction P, and a positive value for $\Delta P$ indicates that the registration error is in the opposite direction of the process direction P.

In operation, the controller 116 adjusts the operation of one or more printheads to correct for the identified registration error $\Delta P$. The controller 116 identifies the linear speed of the belt 104 and media sheet 620 based on signals received from the rotational velocity sensor 120. Controller 116 estimates the position of the media sheet 620 in the print zone 102 by multiplying the linear speed of the belt 104 by an amount of time that the media sheet has been in the print zone 102. The sheet sensor 132 generates signals indicating when the sheet 620 enters the print zone 102 to provide a time reference for the controller 116. The controller 116 adjusts the estimated position of the media sheet 622 by the differential belt displacement $\Delta P$ as the media sheet location 622 approaches the black printhead 148. The controller 116 changes the time at which the black printhead 148 ejects ink drops so that the ink drops land on the media sheet 620 at location 622. Controller 116 identifies the magnitude of the time change as the magnitude of $\Delta P$ divided by the identified linear velocity of the belt 104. When the value of $\Delta P$ is positive, controller 116 delays operation of the black printhead 148 by the identified time, and when the value of $\Delta P$ is negative, the controller 116 advances the operation of the printhead 148 by the identified time. While the preceding example is directed to operation of the cyan and black printheads on a single location of a media sheet, the controller 116 is configured to identify the differential belt displacements $\Delta P$ between each of the printheads to correct for identified registration errors on multiple different locations of each media sheet.

As seen above, identifying the drag force profile T(x,t) on the belt 104 enables identification of displacement of the belt 104 at different times and positions. One challenge with determining the drag force profile T(x,t) is that the normal force g(x,t) applied to the belt 104 changes as one or more media sheets are carried along the belt. This change can be seen in FIG. 6A and FIG. 6B as a portion of the media sheet 620 moves over the vacuum platen 112 in FIG. 6A, and the entire media sheet 620 is over the vacuum platen 112 in FIG. 6B. Between FIG. 6A and FIG. 6B, the total level of drag force and corresponding displacement of the belt 104 changes, with the drag force increasing as a larger portion of the media sheet 620 moves over the vacuum platen 112. When the entire media sheet 620 is over the vacuum platen 112, the total cumulative drag force exerted on the belt 104 remains constant, and the displacement of the belt 104 at a given position may be identified with respect to the drag force and the location of the media sheet 620 in the print zone 102. Two processes for generating drag force parameters that enable identification of the drag profile as media sheets enter, move over, and exit the print zone 102 are described below.

Figure 2:
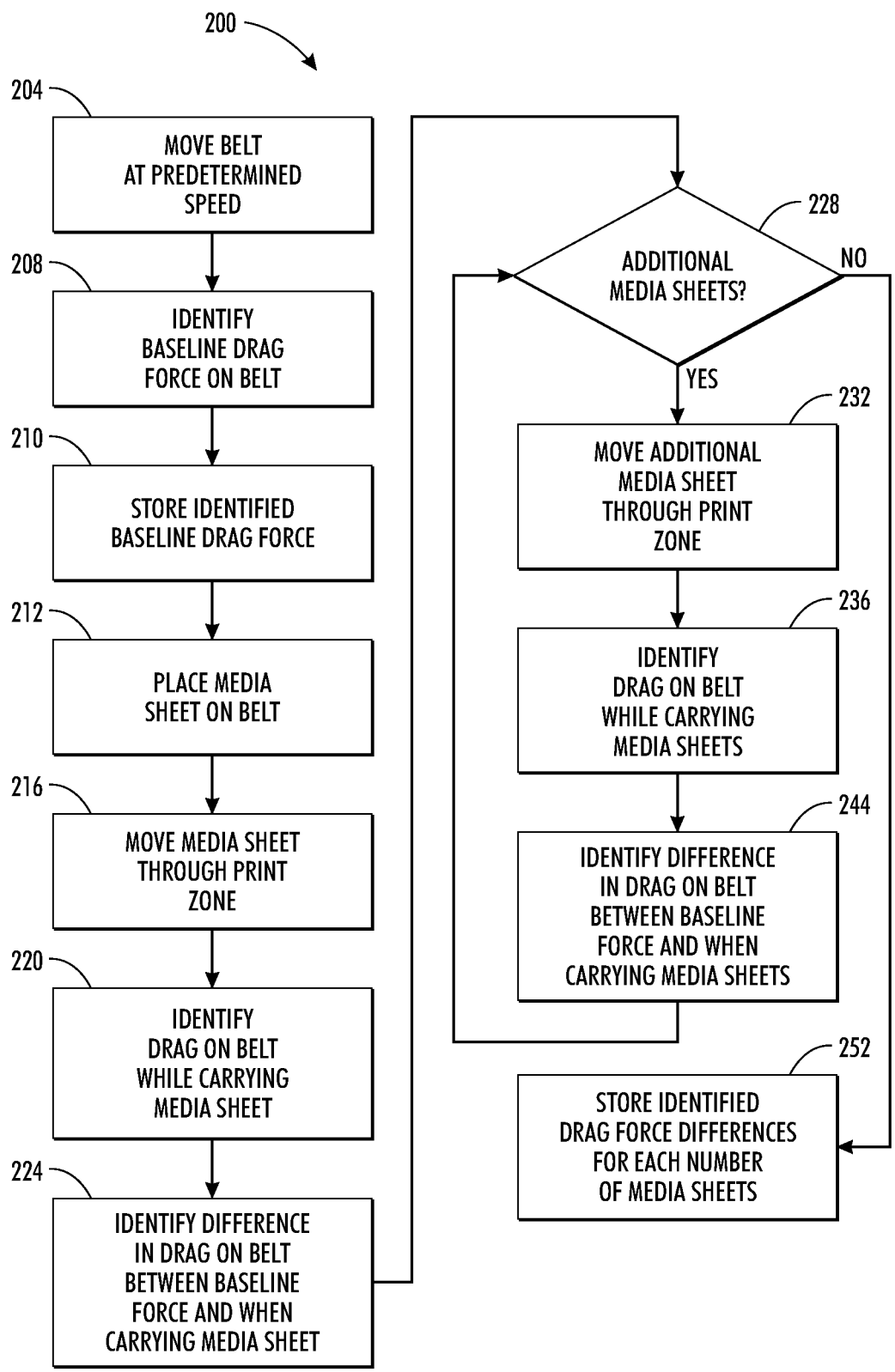
FIG. 2 is a block diagram of a process for identifying differences between a baseline drag force exerted on a belt moving through a print zone and a drag force exerted on the belt as the belt carries one or more media sheets through the print zone.

FIG. 2 depicts a process 200 for identifying differences between a baseline drag force exerted on a belt moving through a print zone and a drag force exerted on the belt as the belt carries one or more media sheets through the print zone. Process 200 is suitable for use with the print zone 102 seen in FIG. 1, FIG. 6A, and FIG. 6B, and the embodiment of print zone 102 is referenced for illustrative purposes below. Process 200 begins by moving belt 104 through the print zone in the process direction P at a predetermined speed (block 204). The predetermined speed is selected to be the same speed at which the belt 104 moves during imaging operations to produce drag forces that are substantially the same as when the print zone is in operation. Process 200 continues by identifying a baseline drag force present on the moving belt 104 (block 208). In the embodiment of FIG. 1, the controller 116 generates a control signal for the amplifier 124 to operate the actuator 128 and the drive roll 108. The controller 116 identifies a control voltage that enables the drive roll 108 to pull belt 104 at the predetermined speed, as also seen in FIG. 5 at line 500. The drag force present on the belt is identified by dividing a torque measured from the outer circumference of the drive roll 108 by the radius of the drive roll 108. The torque may be identified from the control voltage, a corresponding drive current output from the amplifier 124 to the actuator 128, and from predetermined operating parameters of the actuator 128 and drive roll 108. The value of the identified baseline drag force is then stored in memory 118 (block 210).

Process 200 continues by placing a media sheet, such as sheet 150, on the moving belt 104 (block 212) and moving the media sheet 212 through the print zone 102 (block 216). As the media sheet enters the print zone 102 and passes over vacuum platen 112, the vacuum platen applies a negative pressure to the media sheet 150 that urges the sheet 150 against the belt 104 and vacuum platen 112. The portion of the vacuum platen 112 under the media sheet 150 exerts a higher normal force on the belt 104 than on portions of the belt 104 that do not carry a media sheet. The increased normal force on the belt 104 also increases the total drag force exerted on the belt 104. The drag force increases from the first drag force identified when the belt 104 carries no media sheets, to a larger second drag force when the entire media sheet 150 is over the vacuum platen 112. Controller 116 maintains the speed of the belt 104 under the increased drag force by increasing the voltage level of the control signal sent to amplifier 124 to increase the torque exerted by the drive roll 108. Controller 116 identifies when the entire media sheet is over the vacuum platen 112 using various techniques, including detecting that the media sheet has passed the media sheet sensor 132 or by identifying that the control voltage applied to the amplifier 124 has increased to a higher level and then stabilized at the higher level, as seen with the voltage signal 508 in FIG. 5. Process 200 identifies the drag on the media belt 104 when carrying the media sheet (block 220) in a similar manner to block 208 above.

After identifying the first drag force exerted on the belt 104 and the drag force exerted on the belt 104 while carrying a media sheet, process 200 identifies the difference in drag forces between the baseline drag force of the belt when carrying no media, and the drag force exerted on the belt when an entire media sheet is in the print zone 102 (block 224). At various times during operation, the media sheet may also be partially in the print zone 102 past the first end 110 of the vacuum platen 112, and partially outside of the print zone 102 when entering or exiting the print zone. The difference in cumulative drag forces on the belt between the baseline cumulative drag force and the actual cumulative drag force when carrying a partial media sheet may be identified using a linear proportionality. For example, if one-third of the media sheet is in the print zone 102, the difference in identified belt drag force is one-third the identified difference in belt drag between the baseline drag force and the drag force when the entire media sheet is in the print zone 102. In other embodiments, non-linear relationships are used to identify the difference in drag force when a portion of the media sheet is in the print zone as well. Some non-linear relationships used are identified empirically based on the configuration and selection of components in the printing system.

In printer embodiments that are configured to move more than one media sheet through the print zone 102 simultaneously, process 200 may continue for additional media sheets placed on the belt (block 228). The exemplary print zone 102 in FIG. 1 may accommodate two media sheets 150 and 152 simultaneously, and alternative configurations may accommodate three or more media sheets. As each additional media sheet moves through the print zone (block 232), process 200 identifies the drag force exerted on the moving belt 104 (block 236) as described above in block 208. Process 200 then identifies the difference between the identified drag force exerted on the belt 104 when carrying the additional media sheets and the baseline drag force (block 244).

Process 200 stores the identified difference between the baseline drag force and the drag force when carrying a media sheet for later use during imaging operations (block 252). In the embodiment of FIG. 1, the controller 116 stores the identified drag force differences in memory 118. In print zone embodiments that are configured to move multiple media sheets through the print zone simultaneously, multiple identified drag force differences are stored with reference to the number of media sheets that generate each drag force difference. Some print zone configurations accommodate a fractional number of media sheets, such as accommodating one full media sheet and one-half of a second sheet simultaneously. In print zones accommodating a fractional number of media sheets, the total drag force is measured when the media sheets cover a maximum portion of the print zone and generate the maximum amount of drag force exerted on the belt. Each identified difference in drag force is stored at any time after the difference is identified.

In process 200, the length of the media sheets used during process 200 should be the same as the length of the media sheets used during imaging operations. As used herein, the length of the media sheet refers to a dimension of the media sheet in the process direction P. Printing systems that are configured to form images on media sheets of various different lengths may repeat process 200 for each length of media sheet, and store the identified belt drag force differences with reference to the number of sheets present in the print zone and with reference to the length of each media sheet. Process 200 may be repeated periodically to correct for changes in drag force that may occur over time as various printer components experience wear.

Figure 3:
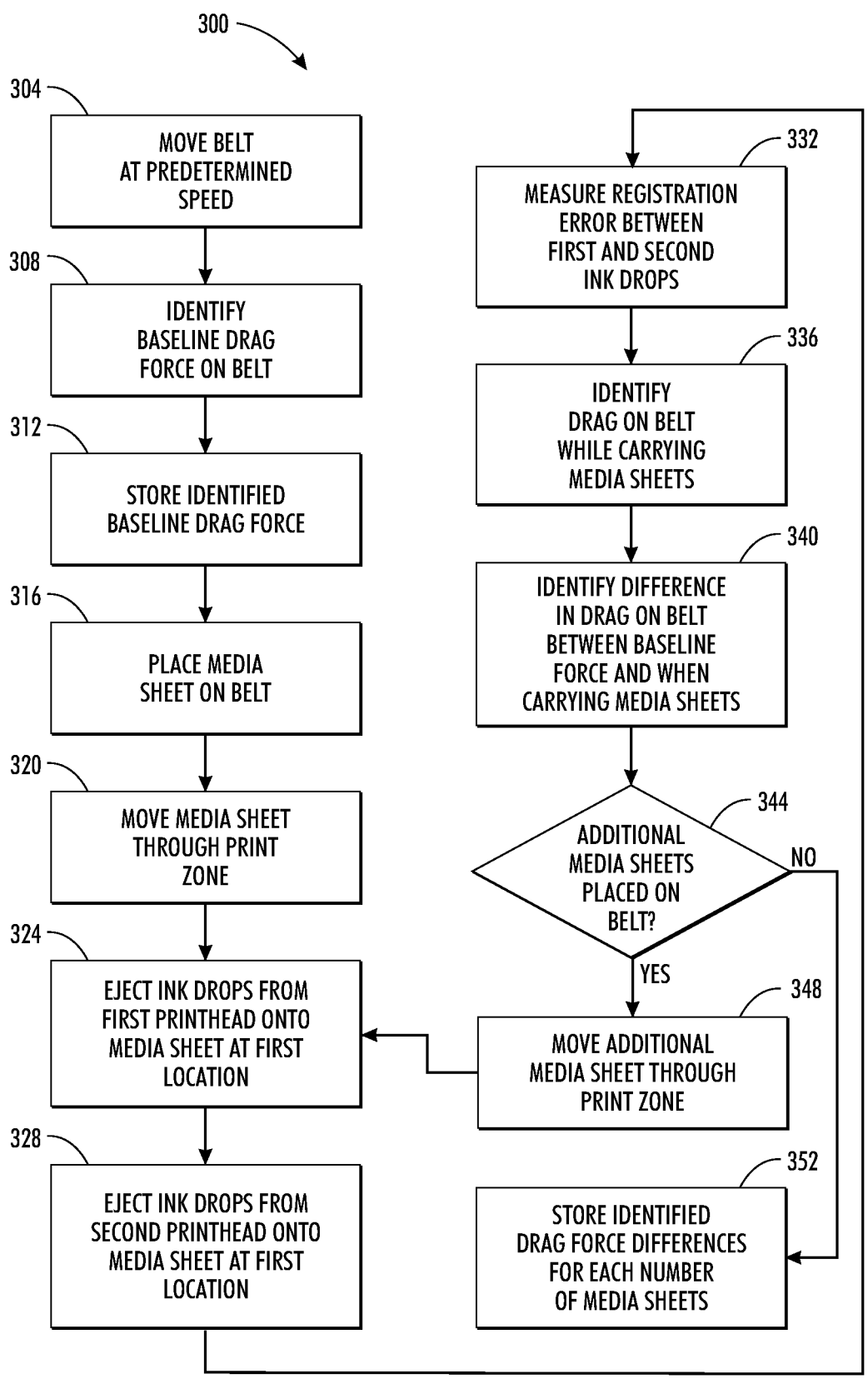
FIG. 3 is a block diagram of another process for identifying differences between a baseline drag force exerted on a belt moving through a print zone and a drag force exerted on the belt as the belt carries one or more media sheets through the print zone.

FIG. 3 depicts an alternative process 300 for identifying differences between a baseline drag force exerted on a belt moving through a print zone and a drag force exerted on the belt as the belt carries one or more media sheets through the print zone. Process 300 begins by moving the belt 104 through the print zone 102 at a predetermined speed (block 304). The belt 104 moves through the print zone at the same speed as during imaging operations. As the belt 104 moves through the print zone, process 300 identifies a baseline drag force exerted on the belt 104 when the belt 104 does not carry media sheets through the print zone 102 (block 308). Process 300 may use various techniques to identify baseline drag force. In one embodiment, the baseline drag force is estimated using the known dynamic coefficient of friction of the belt 104, density of material used to form the belt, and surface area of the belt 104 in contact with the vacuum plenum 112. In the embodiment of FIG. 1, the belt 104 includes a plurality of fiducial marks that are evenly spaced at predetermined intervals on the belt 104. As the belt 104 stretches due to drag forces, the distance between the fiducial marks changes. The distance between fiducial marks at a predetermined location in the print zone 102 is measured by an optical sensor, such as optical sensor 134, that is positioned in the print zone 102 and operatively connected to the controller 116. Alternatively, the distance between fiducial marks is measured manually and provided to the controller 116. The belt displacement is identified from the difference between the measured distance between the fiducial marks and the distance between the marks when the belt 104 is slack. The baseline drag force is identified by dividing the measured belt displacement by the proportionality constant k. The identified baseline drag force is stored in the memory 118 (block 312).

Once the baseline drag force is identified on the belt 104, a media sheet is placed on the belt 104 (block 316) and is moved through the print zone 102 (block 320). As the media sheet moves through the print zone, a first printhead ejects ink drops onto the media sheet at a predetermined location on the media sheet. Using FIG. 1 as an example, as media sheet 152 passes through the print zone 102, the magenta printhead 140 ejects ink drops onto a predetermined location 153 of the media sheet 152 (block 324). The belt 104 carries the media sheet 152 in the process direction P past the yellow printhead 144 and black printhead 148. As the media sheet 152 passes the black printhead 148, the black printhead ejects ink drops onto the predetermined location 153 (block 328). In FIG. 1, the control 116 monitors the velocity of the belt 104 using signals from the velocity sensor 120, and identifies a time at which the media sheet 152 enters the print zone 102 from signals generated by the sheet sensor 132. The controller 116 identifies the position of the media sheet 152 as the media sheet 152 moves past the printheads, and operates the magenta printhead 140 and black printhead 148 to eject drops onto location 153.

In process 300, the controller 116 does not adjust the operation of the black printhead 148 to account for differences in belt stretch as the media sheet 152 moves through the print zone 102, resulting in a registration error between the magenta ink drops and black ink drops. The difference in registration between the ink drops is measured (block 332). Various techniques may be used to measure the differences in registration. In one embodiment, an optical sensor, such as optical sensor 134, that is operatively coupled to the controller 116 measures the differences in registration, while in other embodiments, the registration error is manually measured and entered into the controller 116.

After measuring the registration error, process 300 identifies the drag force exerted on the belt while the belt carries a media sheet with reference to the registration error (block 336). The measured registration error is equivalent to the additional belt displacement due to the additional drag exerted on the belt 104 as the media sheet 152 passes over the vacuum plenum 112. The total amount of belt displacement is the sum of the measured registration error and the identified belt displacement when the belt 104 moves through the print zone without carrying any media sheets as described in block 308. The total drag force exerted on the belt as the media sheet 152 is carried through the print zone 102 is identified by dividing the total measured belt displacement by the proportionality constant k. Once the baseline drag force and total drag force are identified, process 300 identifies a difference between the total drag force when carrying the media sheet and the baseline drag force (block 340).

Process 300 may continue as one or more additional media sheets are placed on the belt (block 344). As seen in FIG. 1, two media sheets 150 and 152 move through the print zone simultaneously, and alternative configurations may accommodate three or more media sheets. The media sheet 152 is positioned upstream from the media sheet 150 in the process direction as the belt 104 carries the media sheets through the print zone 102. As the belt 104 carries media sheets through the print zone 102, additional media sheets may be placed on the belt at a position that is upstream of the print zone to enable the belt 104 to carry the media sheets through the print zone in the process direction. The belt carries each additional media sheet through the print zone as other media sheets also move through the print zone (block 348). Process 300 repeats the ejection of ink drops from the first and second printheads (blocks 324 and 328), identification of registration errors (block 332) and identification of the total drag force exerted on the belt while the belt carries multiple media sheets (block 336). Process 300 identifies a difference between the total drag with two or more media sheets in the print zone and the baseline drag (block 340). Process 300 stores the identified difference between the baseline drag force and the drag force when carrying a media sheet for later use during imaging operations (block 352). In the embodiment of FIG. 1, the controller 116 stores the identified drag force differences in memory 118. In print zone embodiments that are configured to move multiple media sheets through the print zone simultaneously, multiple identified drag force differences are stored with reference to the number of media sheets that generate each drag force difference. Each identified difference in drag force may be stored at any time after the difference is identified.

While the foregoing description of process 300 describes the magenta and black printheads emitting ink drops onto a media sheet, any two printheads arranged in the print zone may be operated to generate registration error measurements. For example, in FIG. 1, process 300 may be carried between the cyan printhead 136 and each of the magenta, yellow, and black printheads 140-148; between the magenta printhead 140 and each of the yellow and black printheads 144-148; and between the yellow printhead 144 and the black printhead 148. Additionally, process 300 may be repeated using various locations on the media sheet to receive ink drops from the printheads. Process 300 may be repeated with various different lengths of media sheets. During operation, a printing system performs process 300 to identify changes in drag force and registration errors due to component wear.

Figure 4:
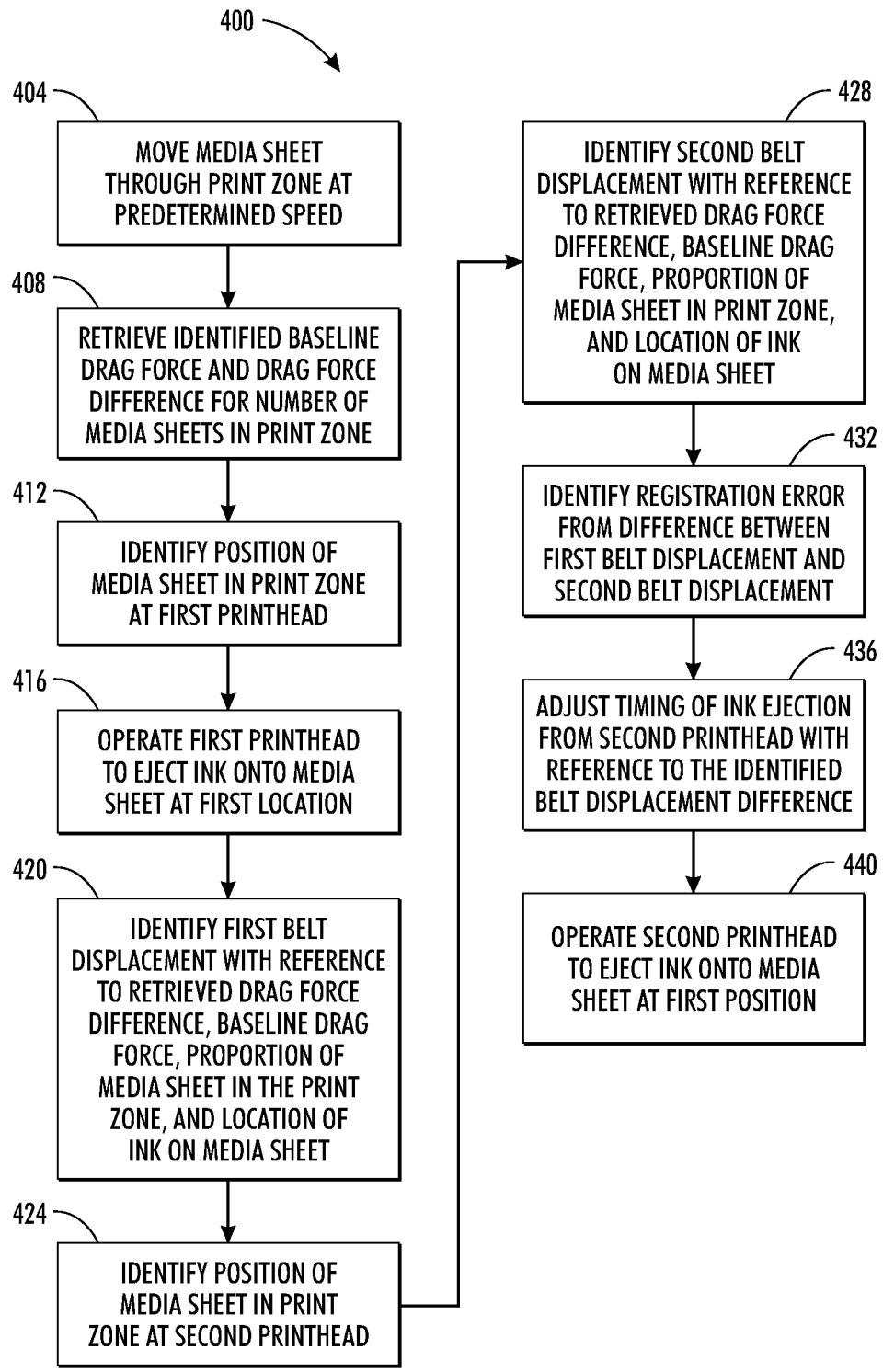
FIG. 4 is a block diagram of a process for correcting registration errors between printheads ejecting inks having different colors due to belt displacement as the belt carries one or more media sheets in a print zone.

Processes 200 and 300 are two alternative processes that each identify differences in the drag force exerted on a moving belt between the baseline drag of an empty belt and the drag exerted on the belt as the belt carries one or more media sheets. FIG. 4 depicts a process 400 for adjusting the operation of a printhead to correct for registration errors caused by changes in the displacement of the belt using the drag force differences identified in process 200 or 300. Process 400 is suitable for use with the printing system embodiment of FIG. 6A and FIG. 6B, which are referenced for illustrative purposes.

Process 400 begins by moving a media sheet placed on moving belt a through a print zone at a predetermined speed (block 404). The predetermined speed of the belt is the same speed of the belt in processes 200 and 300. As the media sheet moves through the print zone, the media sheet passes multiple printheads arranged in the print zone. Each printhead ejects ink onto various locations of the media sheet to form an ink image. Process 400 enables multiple printheads to eject ink drops onto one or more predetermined locations on media sheets as a belt carrying the media sheets experiences changes in drag force and stretch on the belt. Using FIG. 6A and FIG. 6B as an example, belt 104 carries media sheet 620 past a first printhead, seen here as cyan printhead 136, and a second printhead, seen here as black printhead 148, that are each configured to eject ink drops onto the media sheet 620 at location 622.

As the media sheet 620 enters the print zone 102, process 400 retrieves the identified baseline drag force and the identified difference in drag force between the baseline drag force and the total drag force when carrying one or more media sheets through the print zone (block 408). Controller 116 is configured to retrieve the identified difference in drag force from memory 118. In the example of FIG. 6A and FIG. 6B, one media sheet 620 moves through the print zone, although alternative configurations carry two or more media sheets simultaneously. As the media sheet 620 moves through the print zone, process 400 identifies the position of the media sheet as the predetermined location 622 approaches the printhead 136 (block 412). In the embodiment of FIG. 6A and FIG. 6B, controller 116 identifies the position of the media sheet 620 using signals from the sheet sensor 132 and the speed of the belt 104 identified from signals generated by the velocity sensor 120. As seen in FIG. 6A, the media sheet 620 is partially over the vacuum platen 112. Sheet sensor 132 may generate a first signal as the leading edge 626 of the media sheet 620 moves over the vacuum platen 112, and a second signal as the trailing edge 624 moves over the vacuum platen 112. The cyan printhead 136 ejects ink drops onto the predetermined location 622 of the media sheet 620 as the media sheet 620 moves past the printhead 136 (block 416).

Process 400 identifies a first displacement of the belt 104 when the media sheet 620 is in the position for receiving ink drops from the cyan printhead 136 as seen in FIG. 6A (block 420). As used herein, the first belt displacement refers to the additional displacement of the belt 104 that occurs due to the additional drag force exerted on the belt as the media sheet 620 moves over the vacuum platen 112 when compared to the baseline drag force between an empty belt 104 and the vacuum platen 112. Process 400 identifies the belt displacement using the retrieved baseline drag force exerted on the belt 104, difference in drag forces between the baseline drag force and drag force when carrying one or more media sheets on the belt 104, the position of the media sheet 620 in the print zone, the proportion of the media sheet that is in the print zone, and the location of the media sheet 622, as described below.

As depicted graphically in FIG. 6A, a portion of the media sheet 620 is over the vacuum platen 112 in the print zone 102 as the cyan printhead 136 ejects ink drops onto position 622 of the media sheet 620. The triangular area 659 represents the cumulative difference in drag force between the baseline drag profile T0 represented by line 650 and the increased cumulative drag force profile under the media sheet 620 at location 622 represented by line segment 653. Triangular area 660 represents the cumulative baseline drag force T0 between the beginning of the print zone 102 and location 622. Triangular areas 659 and 660 form a single right-triangle 652 with base 655, height 657, and a hypotenuse 653 that is equivalent to the drag force T(x,t) from the beginning of the print zone 112 to the location 622 on the media sheet 620. The belt displacement from equation P(x,t) is proportional to the area of triangle 659 in FIG. 6A.

To determine the base 655 of the triangular area 659, process 400 identifies the proportion of the media sheet 620 that is both in the print zone 102 and upstream of the location 622 that receives ink drops. As media sheets enter and exit the print zone, only a portion of the media sheet is positioned over the vacuum platen 112. In the example of FIG. 6A, fifty percent of the media sheet 620 is over the vacuum platen 112. Process 400 also identifies the proportion of the media sheet that is upstream of the location 622 on the media sheet 620 that receives the ink drops. In FIG. 6A, the location 622 is at a location that is ten percent of the length of the media sheet from the leading edge 626. Thus, in the example of FIG. 6A, forty percent of the media sheet 620 between the trailing edge 624 and the predetermined location 622 is over the vacuum platen 112. Process 400 identifies the total difference in drag force at location 622 as forty percent of the difference in drag force retrieved from memory in process block 408. The base leg 655 is identified as forty percent of the length of the media sheet 620, or approximately 119 mm for an A4 size media sheet.

Process 400 identifies the height 657 of the triangle 652 by adding the cumulative baseline drag force T0 at the location in the print zone 102 corresponding to location 622 on the media sheet 620 and the previously identified difference in drag force at location 622. Process 400 identifies the baseline drag force as a proportion of the total baseline drag force retrieved in block 408 at a position corresponding to location 622 in the print zone. Process 400 identifies the area of the triangle 652 as one-half the base 655 multiplied by the height 657, providing the cumulative drag force T(x,t) for the media sheet in the position seen in FIG. 6A as seen in the equation for P(x,t). Process 400 also identifies the triangular area 660 from the base leg 655 and the identified baseline drag force at location 622, providing the T0 term as seen in equation P(x,t). Process 400 identifies the first belt displacement $P_1$ by multiplying the difference between T(x,t) and T0 by the proportionality constant k according to equation P(x,t).

In the example of FIG. 6A, controller 116 performs process block 420. As described above, the controller 116 identifies the proportion of the media sheet 620 that is over the vacuum platen 112 with reference to signals generated by the media sensor 132 and the predetermined speed of the belt 104. The controller 116 identifies the predetermined location 622 on the media sheet 620 using image data provided to the controller to operate the printheads 136-148 to print images on the media sheet 620. A parameter associated with the image data identifies the total length of the media sheet 620, and the controller identifies the length of the media sheet that is upstream of the location 622 with reference to the total length of the media sheet. The controller 116 retrieves the baseline drag force and difference in identified difference in drag force when carrying a media sheet from the memory 118, and identifies the height 657 of the triangle 660 using the retrieved values, the predetermined length of the print zone 102, and the proportion of the media sheet upstream of location 622. The controller 116 identifies the first belt displacement by subtracting the area 660 from the total area of triangle 652, and multiplying by the proportionality constant k, which is retrieved from the memory 118.

Process 400 continues as the media sheet 620 moves through the print zone 102 to the black printhead 148. Process 400 identifies the position of the media sheet 620 as the predetermined location 622 passes the black printhead 148 (block 424). Process 400 next identifies a second relative belt displacement for the belt 104 as the media sheet 620 passes under the black printhead 148 (block 428). Process 400 identifies the second belt displacement $P_2$ in the same manner as in process block 420, with triangular area 669 in FIG. 6B representing the difference between the cumulative drag force under the media sheet 620 and the baseline cumulative drag force. In the position of FIG. 6B, the entire media sheet 620 is in the print zone 102. Thus, ninety-percent of the media sheet 620 is upstream of the location 622 in the print zone 102. The difference in cumulative drag force between the media sheet and the baseline cumulative drag fore is seen graphically as triangle 669. As seen, corresponding areas and cumulative drag forces are different between triangle 669 and triangle 659 in FIG. 6A, resulting in a different value for the identified belt displacement $P_2$ than for the first belt displacement $P_1$. Process 400 identifies the position of the media sheet 620 under the second printhead and the belt displacement under the second printhead at a time prior to the media sheet 620 actually moving under the second printhead. Identifying the second belt displacement prior to the arrival of the media sheet 620 under the printhead 648 enables process 400 to either delay the operation of the printhead 148 or bring the operation of printhead 148 forward in time as described in more detail below.

Process 400 next identifies a registration error between the first and second printheads when printing to the predetermined location on the media sheet (block 432). The registration error is equivalent to the difference $\Delta P$ between the first belt displacement $P_1$ and the second belt displacement $P_2$ using the following equation: $\Delta P = P_2 - P_1$. The magnitude of $\Delta P$ is equivalent to the registration error between ink drops ejected onto location 622 of the media sheet 620 due to changes in the displacement of the belt 104 as the belt 104 carries the media sheet 620 between the cyan printhead 136 and black printhead 148. In the configuration seen in FIG. 6A and FIG. 6B, a negative value of $\Delta P$ indicates that the direction of the registration error is in the same direction as the process direction P, and a positive value for $\Delta P$ indicates that the registration error is in the opposite direction of the process direction P.

Process 400 continues by adjusting the operational timing of the second printhead to correct for the identified registration error (block 436). In the example of FIG. 6B, the controller 116 is configured to adjust the time at which the black printhead 148 ejects ink drops onto the media sheet 620. The controller 116 identifies the magnitude of the time adjustment $\Delta t$ by dividing the identified registration error by the predetermined speed of the belt 104. The black printhead 148 is configured to operate at a predetermined time $t_k$ by default, and the controller 116 adjusts the time by $t_k + \Delta t$. When $\Delta t$ is a negative number, the controller 116 operates the black printhead 148 earlier than the default time $t_k$, and when $\Delta P$ is a positive number, the controller 116 operates the black printhead 148 later than the default time $t_k$. Process 400 operates the second printhead using the adjusted time $t_k + \Delta t$ to eject ink drops onto the predetermined location 622 on the media sheet (block 440). The adjusted timing for operating the black printhead 148 compensates for registration errors introduced by changes to the displacement of the belt 104 as the media sheet 620 moves through the print zone 102.

Process 400 may be performed for various locations on a single media sheet that receive ink ejected from two or more printheads in a print zone. As seen above, the difference in cumulative drag force between the baseline drag force and the additional drag force present under the media sheet increases beginning from the trailing edge of the sheet. Thus, process 400 identifies different relative belt displacements for the media sheet with reference to both the position of the media sheet in the print zone 102 and the location on the media sheet that receives ink drops. Process 400 is also used in configurations where two or more media sheets are present in a print zone. When multiple media sheets are present, process 400 identifies the proportion of cumulative drag force upstream of a predetermined location on one media sheet with reference to the upstream portion of the media sheet, as well as any additional media sheets that are located upstream of the media sheet receiving ink in the print zone. For example, in FIG. 1, process 400 identifies the displacement of the belt 104 at location 154 of media sheet 150 using the portion of the media sheet 150 that is upstream of the location 154, and the portion of upstream sheet 152 that is positioned in the print zone 102. Thus, process 400 identifies changes in belt displacements when all or some of one or more media sheets are present in the print zone 102.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method of operating a printer comprising:
   operating an actuator to move a sheet carrying device in a process direction through a print zone at a predetermined speed;
   moving a first media sheet on the sheet carrying device past a first end of the print zone and through the print zone in the process direction;
   identifying a first sheet carrying device displacement with reference to a drag force exerted on the sheet carrying device when a predetermined location of the first media sheet is at a first location in the print zone that corresponds to a first printhead;
   operating the first printhead to eject ink onto the first media sheet at the predetermined location;
   identifying a second sheet carrying device displacement with reference to a second drag force exerted on the sheet carrying device when the predetermined location of the first media sheet is at a second location in the print zone that corresponds to a second printhead, the second printhead being located from the first printhead in the print zone in the process direction;
   adjusting a time to operate the second printhead with reference to the predetermined speed of the sheet carrying device and a difference between the first sheet carrying device displacement and the second sheet carrying device displacement; and
   operating the second printhead with reference to the adjusted time to eject ink onto the predetermined location of the first media sheet.

2. The method of claim 1, the identification of the first sheet carrying device displacement further comprising:
   identifying a third sheet carrying device displacement at the first location in the print zone when the predetermined location of the first media sheet is at the first location;
   identifying a fourth sheet carrying device displacement at the first location in the print zone in an absence of any media sheets being within the print zone; and
   identifying a difference between the third sheet carrying device displacement and the fourth sheet carrying device displacement as the first sheet carrying device displacement.

3. The method of claim 2, the identification of the third sheet carrying device displacement further comprising:
   obtaining a value corresponding to a drag force from a memory, the value of the drag force being a total drag force exerted on the sheet carrying device when the first media sheet is entirely within the print zone;
   identifying a proportion of the first media sheet that is between the first end of the print zone and the predetermined location of the first media sheet when the predetermined location of the first media sheet is at the first location in the print zone;
   identifying a drag force exerted on the sheet carrying device with reference to the proportion and the value corresponding to the drag force; and
   identifying the third sheet carrying device displacement with reference to a plurality of sheet carrying device parameters and the identified drag force.

4. The method of claim 2, the identification of the fourth sheet carrying device displacement further comprising:

obtaining a value corresponding to a drag force from a memory, the value of the drag force being a total drag force exerted on the sheet carrying device when the sheet carrying device moves through the print zone in the absence of any media sheets within the print zone;

identifying a proportion of the sheet carrying device that is between the first end of the print zone and the first location in the print zone;

identifying a drag force exerted on the sheet carrying device at the first location in the print zone with reference to the proportion and the value corresponding to the drag force; and identifying the fourth sheet carrying device displacement with reference to a plurality of sheet carrying device parameters and the identified drag force.

5. The method of claim 2, the identification of the third sheet carrying device displacement further comprising:

moving a second media sheet through the print zone on the sheet carrying device in the process direction while the first media sheet moves through the print zone;

obtaining a value corresponding to a drag force from a memory, the value of the drag force being a maximum drag force exerted on the sheet carrying device when the first media sheet and the second media sheet are on the sheet carrying device within the print zone;

identifying a proportion of the first media sheet that is between the first end of the print zone and the predetermined location of the first media sheet in the print zone when the predetermined location of the first media sheet is at the first location in the print zone;

identifying a proportion of the second media sheet that is between the first end of the print zone and the first media sheet when the predetermined location of the first media sheet is at the first location in the print zone;

identifying a drag force exerted on the sheet carrying device with reference to the proportion of the first media sheet, the proportion of the second media sheet, and the value corresponding to the drag force; and identifying the third sheet carrying device displacement with reference to a plurality of sheet carrying device parameters and the identified drag force.

6. The method of claim 5, the plurality of sheet carrying device parameters including a modulus of elasticity of the sheet carrying device and a surface area of the sheet carrying device in the print zone.

7. The method of claim 2, the identification of the second sheet carrying device displacement further comprising:

identifying a fifth sheet carrying device displacement when the predetermined location of the first media sheet is at the second location in the print zone;

identifying a sixth sheet carrying device displacement at the second location in the print zone in an absence of any media sheets being within the print zone; and identifying a difference between the fifth sheet carrying device displacement and the sixth sheet carrying device displacement as the second sheet carrying device displacement.

8. A method of operating a printer, the method comprising:

operating an actuator to move a sheet carrying device in a process direction through a print zone at a predetermined speed;

identifying a first drag force exerted on the sheet carrying device in the print zone;

moving a first media sheet through the print zone on the sheet carrying device in the process direction;

identifying a second drag force exerted on the sheet carrying device in the print zone in response to the first media sheet being entirely within the print zone;

moving a second media sheet through the print zone while moving the first media sheet through the print zone;

identifying a third drag force exerted on the sheet carrying device in the print zone in response to at least a portion of the first media sheet and the second media sheet being within the print zone;

storing a value corresponding to the first drag force in a memory;

storing a value corresponding to the second drag force in the memory; and storing a value corresponding to the third drag force in a memory with reference to a number of media sheets in the print zone.

9. The method of claim 8, the second drag force being stored in the memory with reference to a length of the first media sheet.

10. The method of claim 8, the identification of the first drag force further comprising:

measuring an electrical signal regulating the actuator moving the sheet carrying device in an absence of any media sheets within the print zone;

identifying a torque of the actuator corresponding to the electrical signal; and identifying the first drag force with reference to the torque.

11. The method of claim 8, the identification of the second drag force further comprising:

measuring an electrical signal regulating the actuator moving the sheet carrying device when the first media sheet is entirely within the print zone;

identifying a torque of the actuator corresponding to the electrical signal; and identifying the second drag force with reference to the torque.

12. The method of claim 8, the identification of the first drag force further comprising:

measuring a first sheet carrying device displacement when the actuator moves the sheet carrying device through the print zone in an absence of any media sheets within the print zone; and identifying the first drag force with reference to the first sheet carrying device displacement and a plurality of sheet carrying device parameters.

13. A method of operating a printer, the method comprising:

operating an actuator to move a sheet carrying device in a process direction through a print zone at a predetermined speed;

identifying a first drag force exerted on the sheet carrying device in the print zone;

moving a first media sheet through the print zone on the sheet carrying device in the process direction;

identifying a second drag force exerted on the sheet carrying device in the print zone in response to the first media sheet being entirely within the print zone, the second drag force being identified by:

operating a first printhead at a first location in the print zone to eject ink onto a predetermined location of the first media sheet;

operating a second printhead at a second location in the print zone to eject ink onto the predetermined location of the first media sheet;

measuring a difference in registration of the ink on the first media sheet between the ink ejected from the first printhead and the ink ejected from the second printhead;

identifying a second sheet carrying device displacement with reference to the difference in registration; and identifying the second drag force with reference to the second sheet carrying device displacement and a plurality of sheet carrying device parameters;

the method also comprising:

storing a value corresponding to the first drag force in a memory; and storing a value corresponding to the second drag force in the memory.

14. An inkjet printing system comprising:

a first printhead and a second printhead arranged in a process direction in a print zone, the second printhead being located from the first printhead in the process direction in the print zone;

a sheet carrying device configured to carry at least one media sheet in the process direction past the first printhead and the second printhead;

an actuator operatively connected to the sheet carrying device and configured to move the sheet carrying device through the print zone at a predetermined speed;

a media sensor configured to generate a signal in response to the at least one media sheet on the sheet carrying device moving past the media sensor in the process direction;

a member positioned to engage the sheet carrying device in the print zone and configured to apply a force to the at least one media sheet to urge the media sheet against the sheet carrying device and the sheet carrying device against the member, the sheet carrying device being configured to carry the at least one media sheet past a first end of the member and through the print zone; and a controller operatively connected to the plurality of printheads, the actuator, and the media sensor, the controller configured to:

operate the actuator to move the sheet carrying device in the process direction through the print zone at the predetermined speed;

identify a location of a first media sheet on the sheet carrying device in the print zone as the first media sheet moves through the print zone in the process direction with reference to the signal from the media sensor and the predetermined speed of the sheet carrying device;

identify a first sheet carrying device displacement with reference to a drag force exerted on the sheet carrying device by the member when a predetermined location of the first media sheet is at a first location in the print zone that corresponds to the first printhead;

operate the first printhead to eject ink onto the first media sheet at the predetermined location;

identify a second sheet carrying device displacement with reference to another drag force exerted on the sheet carrying device by the member when the predetermined location of the first media sheet is at a second location in the print zone that corresponds to the second printhead;

adjust a time to operate the second printhead with reference to the predetermined speed of the sheet carrying device and a difference between the first sheet carrying device displacement and the second sheet carrying device displacement; and operate the second printhead with reference to the adjusted time to eject ink onto the predetermined location of the first media sheet.

15. The system of claim 14 including a memory operatively connected to the controller, the controller being further configured to:

operate the actuator to move the sheet carrying device in the process direction through the print zone at the predetermined speed;

identify a first drag force exerted on the sheet carrying device in the print zone in an absence of any media sheets being urged against the sheet carrying device by the member;

identify a second drag force exerted on the sheet carrying device in the print zone when the sheet carrying device carries a media sheet, an entire length of the media sheet being urged against the sheet carrying device by the member;

store a value corresponding to the first drag force in the memory; and store a value corresponding to the second drag force in the memory.

16. The system of claim 15, wherein the controller stores the value corresponding to the second drag force in the memory with reference to a length of the media sheet.

17. The system of claim 15, the controller being further configured to:

identify a third drag force exerted on the sheet carrying device in the print zone when the sheet carrying device carries at least a portion of the media sheet and another media sheet through the print zone, the at least a portion of the media sheet and the other media sheet being urged against the sheet carrying device by the member; and store a value corresponding to the third drag force in the memory with reference to a number of media sheets in the print zone.

18. The system of claim 15, further comprising:

an electrical amplifier, the amplifier being configured to supply an electrical current to the actuator, the controller being operatively connected to the electrical amplifier and configured to generate a control signal for regulation of the electrical current supplied by the electrical amplifier to the actuator, the controller being configured to:

measure the control signal in an absence of any media being urged against the sheet carrying device by the member;

identify a first torque of the actuator corresponding to the control signal;

identify the first drag force with reference to the first torque;

measure a second control signal when the entire length of the media sheet is urged against the sheet carrying device by the member;

identify a second torque of the actuator corresponding to the second control signal; and identify the second drag force with reference to the second torque.

19. The system of claim 15, further comprising:

an optical sensor positioned in the print zone and configured to generate a signal corresponding to light reflected from ink on a media sheet that moves past the optical sensor in the print zone, the controller being operatively connected to the optical sensor and configured to:

operate the first printhead to eject ink onto a predetermined location of a media sheet moving through the print zone;

operate the second printhead to eject ink onto the predetermined location of the media sheet;
receive signals from the optical sensor corresponding to a location of the ink from the first printhead and a location of the ink from the second printhead on the media sheet;
measure a difference in registration of the ink on the first media sheet between the ink ejected from the first printhead and the ink ejected from the second printhead with reference to the signals;
identify a sheet carrying device displacement with reference to the difference in registration; and
identify the second drag force with reference to the sheet carrying device displacement and a plurality of sheet carrying device parameters.

20. The system of claim 14 including a memory operatively connected to the controller, the controller being configured to:
obtain a value corresponding to a first drag force from the memory, the first drag force being a total drag force exerted on the sheet carrying device when an entire length of the first media sheet is urged against the sheet carrying device by the member;
identify a proportion of the first media sheet that is between the first end of the member and the predetermined location of the first media sheet when the predetermined location of the first media sheet is at the first location in the print zone;
identify a proportional drag force exerted on the sheet carrying device with reference to the proportion and the value corresponding to the first drag force;
identify a third sheet carrying device displacement when the predetermined location of the first media sheet is at the first location in the print zone with reference to a plurality of sheet carrying device parameters and the proportional drag force;
obtain a value corresponding to a second drag force from the memory, the second drag force being a total drag force exerted on the sheet carrying device when the sheet carrying device moves through the print zone in an absence of any media sheets being urged against the sheet carrying device by the member;
identify a proportion of the sheet carrying device that is between the first end of the member and the first location in the print zone;
identify a baseline drag force exerted on the sheet carrying device at the first location in the print zone with reference to the proportion of the sheet carrying device and the value corresponding to the second drag force;
identify a fourth sheet carrying device displacement with reference to a plurality of sheet carrying device parameters and the baseline drag force exerted on the sheet carrying device; and
identify a difference between the third sheet carrying device displacement and the fourth sheet carrying device displacement as the first sheet carrying device displacement.

21. The system of claim 20, the controller being configured to:
identify a second proportion of the first media sheet that is between the first end of the member and the predetermined location of the media sheet when the predetermined location of the first media sheet is at the second location in the print zone;
identify a second proportional drag force exerted on the sheet carrying device with reference to the second proportion of the first media sheet and the value corresponding to the first drag force;
identify a fifth sheet carrying device displacement with reference to a plurality of sheet carrying device parameters and the second proportional drag force;
identify a second proportion of the sheet carrying device that is between the first end of the member and the second location in the print zone;
identify a second baseline drag force exerted on the sheet carrying device at the second location in the print zone with reference to the second proportion of the sheet carrying device and the value corresponding to the second drag force;
identify a sixth sheet carrying device displacement with reference to a plurality of sheet carrying device parameters and the second baseline drag force; and
identify the second sheet carrying device displacement as a difference between the fifth sheet carrying device displacement and the sixth sheet carrying device displacement.

22. The system of claim 21, the plurality of sheet carrying device parameters including a modulus of elasticity of the sheet carrying device and a surface area of the sheet carrying device that engages the member.

23. The system of claim 21, the controller being further configured to:
obtain a value corresponding to a third drag force from the memory, the third drag force being a total drag force exerted on the sheet carrying device when at least a portion of the length of the first media sheet and a portion of a length of a second media sheet are urged against the sheet carrying device by the member, the first media sheet being located in the process direction from the second media sheet;
identify a proportion of the second media sheet that is between the first end of the member and the first media sheet when the predetermined location of the first media sheet is at the first location in the print zone;
identify a third proportional drag force exerted on the sheet carrying device with reference to the proportion of the first media sheet, the proportion of the second media sheet, and the value corresponding to the third drag force;
identify the third sheet carrying device displacement with reference to the plurality of sheet carrying device parameters and the third proportional drag force;
identify a second proportion of the second media sheet that is between the first end of the member and the first media sheet when the predetermined location of the first media sheet is at the second location in the print zone;
identify a fourth proportional drag force exerted on the sheet carrying device with reference to the proportion of the first media sheet, the second proportion of the second media sheet, and the value corresponding to the third drag force; and
identify the fifth sheet carrying device displacement with reference to the fourth proportional drag force and the plurality of sheet carrying device parameters.

* * * * *